United States Patent [19]

Hayashida et al.

[11] 4,009,688
[45] Mar. 1, 1977

[54] ROTARY PISTON TYPE ENGINE

[75] Inventors: Motoyuki Hayashida; Mutsuo Wakamoto; Akinori Tamura; Masafumi Ikegami, all of Hiroshima, Japan

[73] Assignee: Toyo Kogyo Co., Ltd., Japan

[22] Filed: Mar. 3, 1975

[21] Appl. No.: 554,929

[30] Foreign Application Priority Data

Mar. 4, 1974 Japan .................. 49-25998
May 4, 1974 Japan .................. 49-50057

[52] U.S. Cl. ................. 123/8.09; 123/32 D; 123/32 ST
[51] Int. Cl.² ..................... F02B 53/10
[58] Field of Search ......... 123/8.09, 8.11, 8.13, 123/32 D, 32 SP, 32 ST; 239/125

[56] References Cited

UNITED STATES PATENTS

| | | | |
|---|---|---|---|
| 2,884,913 | 5/1959 | Heintz | 123/32 SP UX |
| 2,984,230 | 5/1961 | Cummins | 239/125 UX |
| 3,174,470 | 3/1965 | Von Seggern et al. | 123/32 SP UX |
| 3,391,677 | 7/1968 | Hejj | 123/8.09 X |
| 3,508,530 | 4/1970 | Clawson | 123/8.09 X |
| 3,587,970 | 6/1971 | Tindall et al. | 239/125 X |
| 3,824,965 | 7/1974 | Clawson | 123/32 SP X |

FOREIGN PATENTS OR APPLICATIONS 947,284  1/1964  United Kingdom ........... 123/8.09

*Primary Examiner*—Carlton R. Croyle
*Assistant Examiner*—Michael Koczo, Jr.
*Attorney, Agent, or Firm*—Fleit & Jacobson

[57] ABSTRACT

Rotary piston type engine comprising a casing having a cavity defined by an inner peripheral wall of trochoidal configuration, a substantially triangular rotor disposed in said cavity for rotation with its apex portions in sliding contact with the inner peripheral wall of the casing to define working chambers of variable volume, a main combustion chamber disposed outside the cavity in the casing and connected with the working chamber in compression stroke, a single fuel injection pump connected through a main fuel injection nozzle to the main combustion chamber and through an auxiliary fuel injection nozzle to the working chamber in intake stroke, and a control valve for allowing fuel to flow through the auxiliary fuel injection nozzle into the working chamber during high load operation of engine.

7 Claims, 6 Drawing Figures

ROTARY PISTON TYPE ENGINE

The present invention relates to rotary piston type internal combustion engines and more particularly to fuel supply means therefor. More specifically, the present invention pertains to rotary piston type engines including a casing provided with an inner peripheral wall for defining a cavity of trochoidal configuration, a substantially polygonal rotor disposed in the casing for rotation with its apices in sliding contact with the inner peripheral wall of the casing so as to define working chambers of variable volume, and main combustion chamber means provided outside the working chambers and communicating with said cavity in the casing.

In such a type of rotary piston engine, air is introduced into the working chamber which is in intake stroke and fuel is mainly supplied to the main combustion chamber to form combustible mixture therein with the air introduced from the working chamber in compression stroke. The mixture in the main combustion chamber is then ignited and combustion takes place in the main combustion chamber. The rotary piston engine of this type is advantageous in that fuel consumption can be remarkably improved as compared with conventional rotary piston engines due to the fact that combustion mainly takes place in the main combustion chamber which has a relatively small surface-to-volume ratio with certain amount of residual combustion gas produced in the previous combustion stroke. The arrangement is further found as being effective in reducing the amount of noxious constituents such as CO, HC and $NO_x$ in the engine exhaust gas. However, this type of engine is disadvantageous in respect of output capacity since total supply of fuel must be decreased in relation to the supply of air in order to maintain the air-to-fuel ratio of the mixture in the main combustion chamber within allowable limit.

In order to eliminate the above problem, it has already been proposed to make additionally supply of fuel to the working chamber which is in compression stroke during acceleration or high speed and high load operation. In this proposed system, however, since the additional fuel is supplied into the working chamber independently from the supply of fuel into the main combustion chamber, a portion of the fuel in the working chamber is forced to flow into the main combustion chamber to form excessively fuel rich mixture therein often resulting in misfire. Thus, engine output is decreased and noxious constituents such as CO and HC are increased in the exhaust gas.

The present invention has therefore an object in a rotary piston engine of the aforementioned type to improve fuel consumption and increase engine output throughout the range of operation without any increase in the noxious constituents in the exhaust gas.

Another object of the present invention is to provide means for controlling supply of fuel into the main combustion chamber in accordance with the supply of additional fuel into the working chamber.

According to the present invention, the above and other objects can be achieved by providing main fuel supply means for supplying fuel into the main combustion chamber, auxiliary fuel supply means for supplying fuel into the working chamber in intake stroke during high load operation of the engine, and control means for controlling the supply of fuel into the main combustion chamber in accordance with the supply of fuel into the working chamber so that air-fuel ratio of the mixture in the main combustion chamber is between 10 and 16. Although a carburetor or fuel injection means may be employed as the auxiliary fuel supply means, it is preferable to use fuel injection means in order to achieve precise control of fuel supply.

In a preferred aspect of the present invention, a single fuel injection pump is provided for supplying fuel into a main fuel supply passage leading to a main fuel injection nozzle in the main combustion chamber and an auxiliary fuel supply passage leading to an auxiliary fuel injection nozzle in the working chamber so that the supply of fuel into the main combustion chamber can be precisely controlled in accordance with the supply of fuel into the working chamber. In a further aspect of the present invention, the flow of auxiliary fuel is utilized to cool the main fuel injection nozzle.

The above and other objects and features of the present invention will become apparent from the following descriptions of preferred embodiment taking reference to the accompanying drawings, in which.

Figure 1:
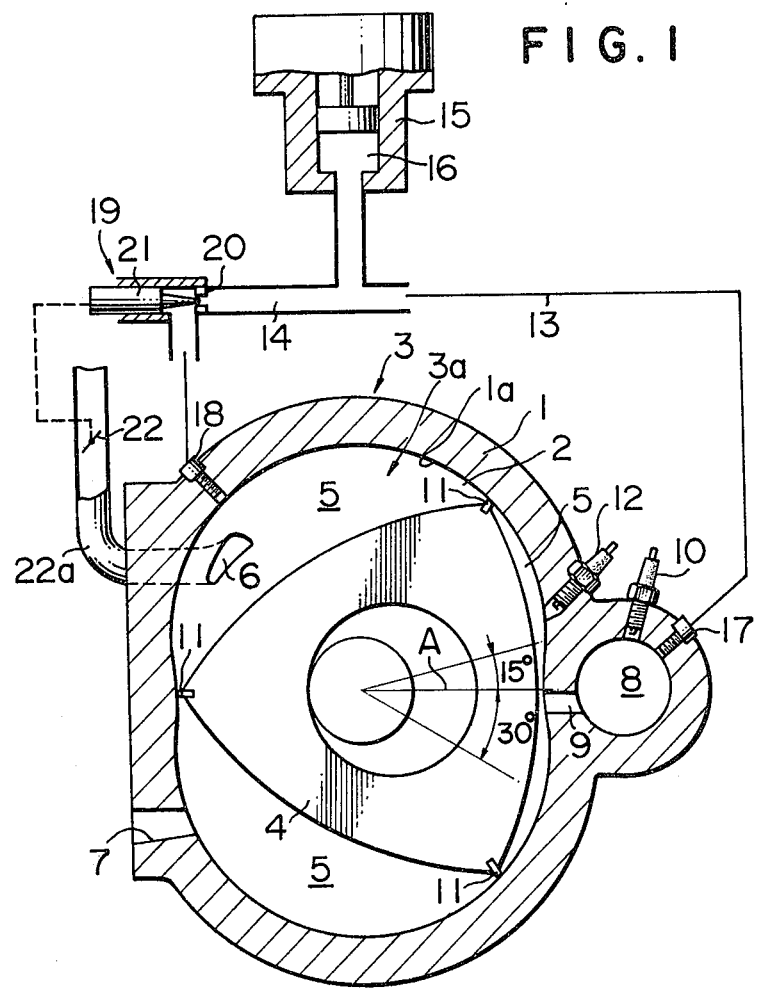
FIG. 1 is a diagrammatical sectional view of a rotary piston type engine including fuel supply means in accordance with the present invention.

Referring now to the drawings, particularly to FIG. 1, there is shown a rotary piston engine comprising a casing 3 constituted by a rotor housing 1 and a pair of side housings 2 disposed at the opposite sides of the rotor housing 1. The rotor housing 1 has an inner peripheral wall 1a which defines a cavity 3a of two-lobed trochoidal configuration in the casing 3. A substantially triangular rotor 4 having apex seals 11 at its apex portions is disposed in the cavity 3a for rotation with the apex seals 11 in sliding contact with the inner peripheral wall 1a of the rotor housing 1. Thus, there are defined working chambers 5 of which volume varies in response to the rotation of the rotor 4.

One of the side housings 2 has an intake port 6 opening to the cavity 3a at the working chamber 5 which is in the intake stroke. The rotor housing 1 is provided with an exhaust port 7 opening to the cavity 3a at the working chamber 5 which is in the exhaust stroke. The casing 3 is further formed with a main combustion chamber 8 which is preferably of spherical configuration so that the surface-to-volume ratio of the chamber 8 becomes as small as possible. The main combustion chamber 8 is connected with the cavity 3a by a communication passage 9 which is preferably offset from the center of the main combustion chamber 8 so that intense swirl is produced in the chamber 8. It is further preferable that the communication passage 9 opens to the cavity 3a at a position between 15° before and 30° after the minor axis A of the trochoid of the cavity 3a. By this arrangement of the communication passage 9, the amount of residual combustion gas in the main combustion chamber 8 is increased with the result that combustion in the chamber 8 takes place slowly so as to substantially decrease the amount of $NO_x$. More specifically, with the communication passage 9 located in the aforementioned range, the apex seal 11 on the rotor 4 passes across the passage 9 when the pressure difference between the working chamber 5 in the compression stroke and the main combustion chamber 8 is small and when the pressure in the main combustion chamber 8 is still high. Therefore, the residual combustion gas in the main combustion chamber 8 is increased and combustion in the chamber 8 takes place slowly with minimum production of $NO_x$. It has been found that the most preferable position of the communication passage 9 is 5° after the minor axis A. In this position of the passage 9, the apex seal 11 passes across the passage 9 when the working chamber 5 in expansion stroke, the working chamber 5 in compression stroke and the main combustion chamber 8 become substantially identical in pressure with each other. In this instance, the working chamber 5 in expansion stroke, that is, the leading side working chamber 5 has begun to communicate with the exhaust port 7 so that the combustion gas in that working chamber 5 has started to flow out and the pressure therein is slightly decreased.

Since the combustion gas in the main combustion chamber 8 contains substantial amount of CO and HC, preferable result can also be obtained in reducing the amount of CO and HC by preventing direct flow of the combustion gas from the main combustion chamber into the working chamber in the expansion stroke.

The main combustion chamber 8 is provided with an ignition plug 10. According to the present invention, the volume of the main combustion chamber 8 is between 35 and 65 percent of the sum of the volume of the working chamber 5 in top dead center and that of the main combustion chamber 8. If the volume of the main combustion chamber 8 is larger than the aforementioned range, the compression ratio will become excessively low. If the volume of the main combustion chamber 8 is smaller than the above range, sufficient combustion energy will not be obtained. Thus, in either case, sufficient output cannot be obtained. It has been found through experiment, a preferable result is obtained when the volume of the main combustion chamber 8 is 50 percent of the sum of the volume of the main combustion chamber 8 and that of the working chamber 5 in top dead center. This fact should be interpreted as a proof that the main combustion chamber 8 in this type of rotary piston engine is distinguishable from the auxiliary chamber in a so-called torch type engine. In other words, the main combustion chamber 8 of the illustrated rotary piston engine is expected to produce substantial part of combustion energy for rotating the rotor 4 and the working chamber 5 serves to compress the intake air introduced through the intake port 6 so as to force the air to flow through the communication passage 9 into the main combustion chamber 8 and also to receive the combustion gas from the main combustion chamber whereby the combustion gas is mixed with the surplus air in the working chamber for secondary combustion.

The illustrated rotary piston engine is provided with fuel supply means including a main fuel passage 13 adapted to supply fuel to the main combustion chamber 8 and an auxiliary fuel supply passage 14 adapted to supply fuel to the working chamber 5 in intake stroke. The main and auxiliary fuel supply passages 13 and 14 are connected with a single fuel injection pump 15 at its metering chamber 16. Further, the main and auxiliary fuel supply passages 13 and 14 are respectively connected with the main combustion chamber 8 and the working chamber 5 in intake stroke through fuel injection nozzles 17 and 18, respectively. The fuel injection pump 15 serves to supply metered fuel in accordance with engine speed and load, so that mixture of air-fuel ratio of 10 to 16 can be obtained in the main combustion chamber 8 during low and medium load operation of the engine. The above allowable range of air-fuel ratio of the mixture has been determined in view of the fact that, with the air-fuel fuel ratio of mixture below or above the allowable range, misfire is often experienced and noxious constituent, particularly HG, is increased in the engine exhaust gas. In conventional engines, combustion gas in the vicinity of ignition plug is effectively expelled and replaced by fresh mixture in each cycle of operation so that adverse effect is not experienced even when the air-fuel ratio is slightly below or above the aforementioned range. However, in the illustrated engine, the position of the communication passage 9 is so selected that appreciable amount of combustion gas is retained in the main combustion chamber 8 as described previously, so that the air-fuel ratio of the mixture in the main combustion chamber 8 must be 10 to 16, preferably 11 to 15.

The auxiliary fuel supply passage 14 is provided with a control valve 19 for controlling fuel supply to the working chamber 5. The control valve 19 includes an orifice 20 disposed in the auxiliary fuel passage 14 and a needle valve 21 co-operating with the orifice 20. The needle valve 21 is interconnected with a throttle valve 22 in an intake passage 22a communicating with the intake port 6. The needle valve 21 is thus actuated in response to the operation of the throttle valve 22 in such a manner that it closes the orifice 20 during low and medium load operation of the engine but opens the orifice 20 during high load operation so that fuel is injected through the nozzle 18 into the intake working chamber 5. It should be noted that the needle valve 21 is so controlled in accordance with the valve opening pressure of the fuel injection nozzles 17 and 18 that the flow resistance of the auxiliary fuel supply passage 14 is varied in relation to that of the main fuel supply passage 13 whereby the air-fuel ratio of the mixture in the main combustion chamber 8 is always maintained within the aforementioned allowable range. It should of course be noted that the control valve 19 may be actuated by other engine load responsive means such as a diaphragm actuated by engine intake pressure.

It is preferable that the pressure at which fuel injection is started in the fuel injection nozzle 17 is higher than the corresponding pressure in the fuel injection nozzle 18 so that increased amount of fuel is supplied to the working chamber 5 in response to an increase in the opening of the orifice 20. This is also advantageous in that fuel is injected with high pressure into swirling air in the main combustion chamber 8 so that penetration depth of the injected fuel into the swirling air is remarkably increased and uniform air-fuel mixture can be formed.

In the arrangement illustrated in FIG. 1, the control valve 19 is disposed in the auxiliary fuel supply passage 14. In an alternative arrangement, however, the control valve may be disposed in the main fuel supply passage 13 and controlled in response to the operation of the engine throttle valve 22 in such a manner that the flow resistance of the passage 13 is increased in response to an increase in the throttle valve opening. In this alternative arrangement, the injection pressure of the nozzles 17 and 18 must be so determined that fuel is not injected into the working chamber 5 during low and medium load operation of the engine. It is of course possible to provide interrelated control valves in both of the passages 13 and 14.

In operation, the opening of the engine throttle valve 22 is below a predetermined value under low or medium load so that the control valve 19 is in the full close position. Thus, the metered fuel from the fuel injection pump 15 is supplied through the main fuel supply passage 13 and the fuel injection nozzle 17 into the main combustion chamber 8 where the fuel is mixed with air introduced thereinto from the compressing working chamber 5 through the communication passage 9 so as to form combustible mixture therein. The mixture is then ignited and combustion takes place only in the main combustion chamber 8.

Figure 4:
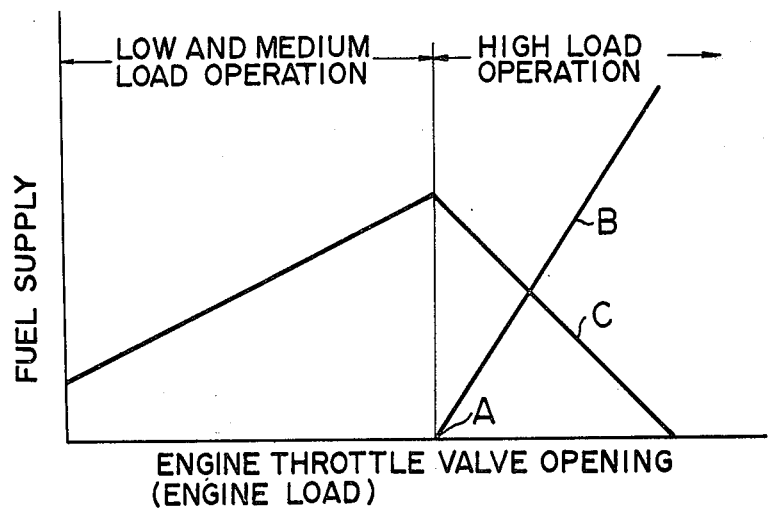
FIG. 4 is a diagram showing the control of fuel supply in accordance with the engine throttle opening.

When the engine throttle valve 22 is opened beyond the aforementioned predetermined value, the needle valve 21 in the control valve 19 is shifted toward left to open the orifice 20. Then, the metered fuel from the pump 15 is allowed to pass through the passages 13 and 14 and injected into the main combustion chamber 8 and the working chamber 5 through the fuel injection nozzles 17 and 18, respectively. As shown in FIG. 4, the amount of fuel supplied to the working chamber 5 increases along the line B in accordance with the increase in the throttle valve opening and the amount of fuel supplied to the main combustion chamber 8 is correspondingly decreased along the line C when the engine throttle valve 22 is opened beyond the predetermined value A. In this instance, since a part of fuel supplied to the working chamber 5 is introduced with compressed air through the communication passage 9 into the main combustion chamber 8, the air-fuel ratio of the mixture in the main combustion chamber 8 is maintained substantially constant although there is gradual decrease in the fuel supply through the nozzle 17 to the chamber 8.

Thus, during high load operation of the engine, the metered fuel from the fuel injection pump 15 is precisely controlled by the control valve 19 and supplied to the main combustion chamber 8 and the working chamber 5 to form combustible mixture therein. Therefore, air in the working chamber 5 can effectively be utilized for combustion, so that high engine output can be obtained.

Figure 2:
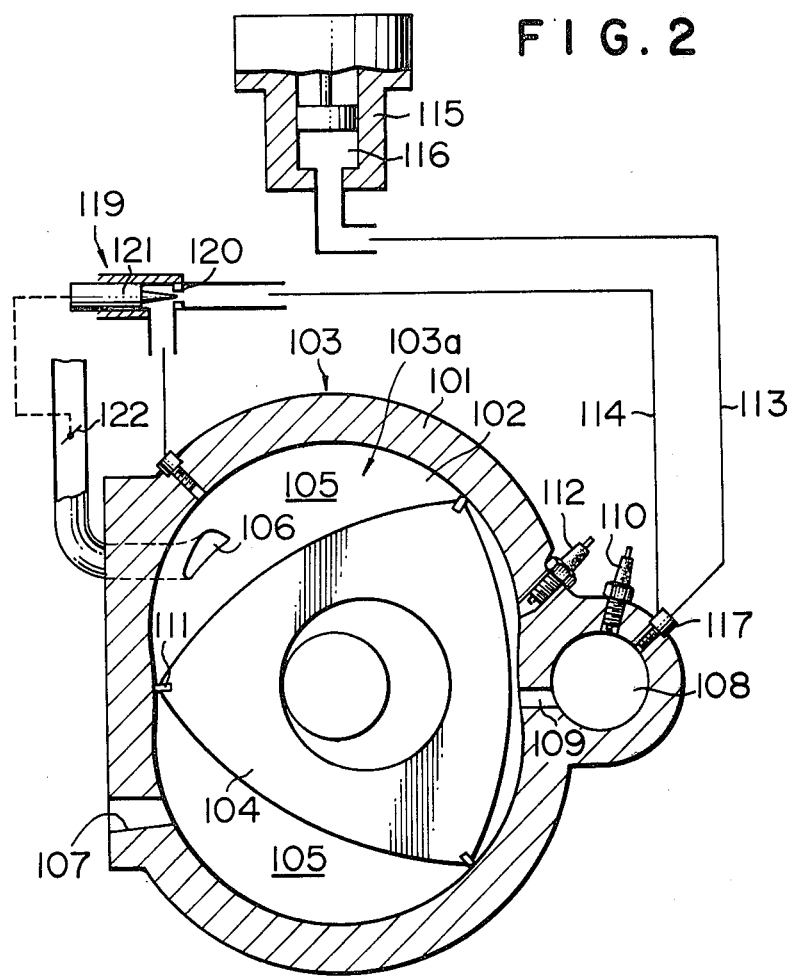
FIG. 2 is a diagrammatical sectional view similar to FIG. 1 but showing another embodiment of the present invention.

Referring now to FIG. 2, there is shown a rotary piston type engine which is identical in basic construction to the engine shown in FIG. 1. Therefore, in FIG. 2, corresponding parts are shown by the same reference numerals with addition of figure hundred. In this embodiment, the fuel supply means comprises a main fuel supply passage 113 which is connected with a fuel injection pump 115 having a metering chamber 116 and has a main fuel injection nozzle 117 for injecting fuel into the main combustion chamber 108. The fuel supply means also comprises an auxiliary fuel supply passage 114 which extends from the main fuel injection nozzle 117 to a fuel injection nozzle 118 for injecting fuel to a working chamber 105 which is in intake stroke. In the auxiliary fuel supply passage 114, there is disposed a control valve 119 which is similar to the control valve 19 in the embodiment of FIG. 1 and includes an orifice 120 and a needle valve 121.

Figure 3:
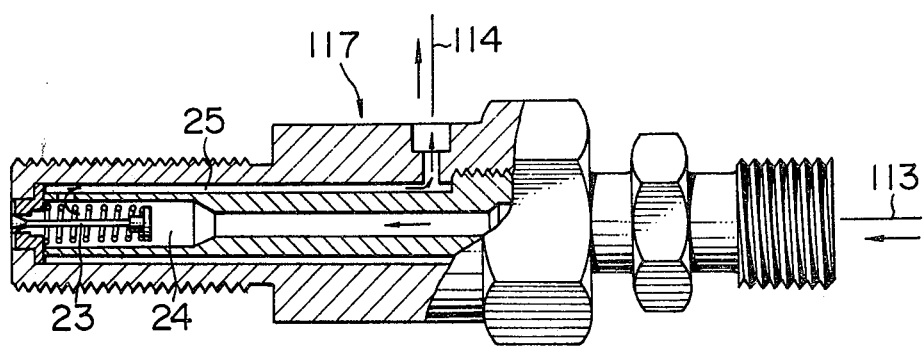
FIG. 3 is a sectional view showing the main fuel injection nozzle used in the embodiment of FIG. 2.

FIG. 3 shows the main fuel injection nozzle 117 in detail. The nozzle 117 comprises an injection fuel passage 24 connected with the supply passage 113 and having an outlet valve 23 at an extreme end. Around the passage 24, there is also formed a cooling passage 25 which is connected on one hand with the passage 24 at a point adjacent to the outlet end of the nozzle and on the other hand with the auxiliary fuel supply passage 114. Thus, the metered fuel from the fuel injection pump 115 is directed through the main fuel supply passage 113 to the main fuel injection nozzle 117. During low and medium load operation, the control valve 119 is closed so that the fuel supplied to the nozzle 117 is totally discharged from the nozzle 117 into the main combustion chamber 108. During high load operation of the engine, the control valve 119 is opened and a part of the fuel supplied to the nozzle 117 is allowed to flow through the auxiliary fuel supply passage 114 and the fuel injection nozzle 118 into the working chamber 105 with corresponding decrease in the amount of fuel supplied to the main combustion chamber 108. Although the amount of fuel injected through the main nozzle 117 is thus decreased, the metered fuel from the fuel injection pump 115 is totally passed through the nozzle 117 even under the high load operation, so that the nozzle 117 can be adequately cooled by the flow of fuel directed through the passage 25 to the auxiliary passage 114.

Figure 5:
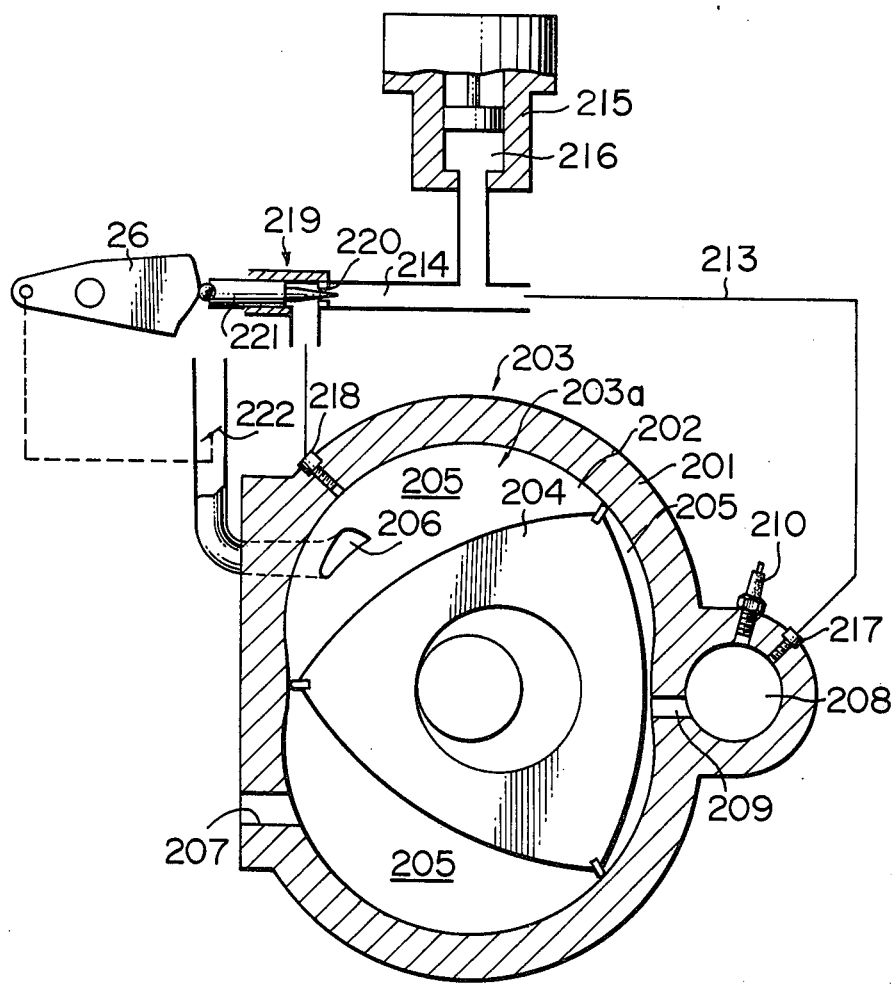
FIG. 5 is a sectional view similar to FIGS. 1 and 2 but showing a further embodiment of the present invention.
Figure 6:
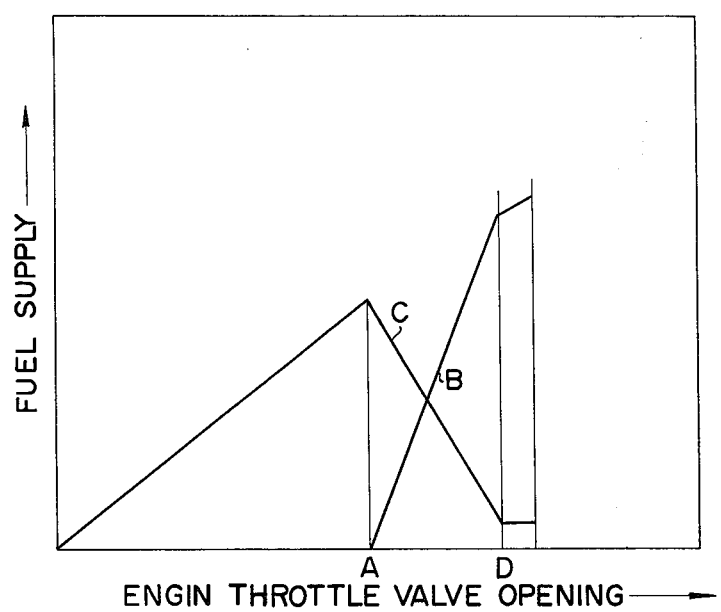
FIG. 6 is a diagram showing the control of fuel supply in the embodiment of FIG. 5.

FIG. 5 shows another embodiment of the present invention. The engine shown in FIG. 5 is identical in basic construction to those shown in FIGS. 1 and 2 so that corresponding parts are shown by the same reference numerals as in FIG. 1 with addition of figure two hundred. This embodiment is different from the embodiment shown in FIG. 1 in that the needle valve 221 in the control valve 219 is controlled in response to the actuation of the engine throttle valve 222 through a cam 26. The cam 26 is so shaped that the fuel flow through the orifice 220 in the control valve 219 is increased in response to the increase in the opening of the throttle valve 222 beyond a predetermined value A as shown in FIG. 6 but the rate of increase in the fuel flow through the orifice 220 is decreased as the throttle valve opening increases beyond a further predetermined value D so that a certain amount of fuel flow is maintained through the main fuel injection nozzle 217 in order to ensure adequate cooling of the nozzle 217 under an extremely high load operation of the engine.

From the above descriptions, it will be apparent that, in accordance with the present invention, supply of fuel to the main combustion chamber is decreased with relation to the increase in the supply of fuel to the intake working chamber under high load operation of the engine so that air-fuel ratio of the mixture in the main combustion chamber can always be maintained within an allowable range. Thus, it is possible to suppress production of noxious constituents throughout the operating range of the engine. Further, the arrangement of the present invention is effective to improve fuel consumption and increase engine output.

The invention has thus been shown and described with reference to specific embodiments, however, it should be noted that the invention is in no way limited to the details of the illustrated structures but changes and modifications may be made without departing from the scope of the appended claims. For example, the main combustion chamber may be provided with an intake passage into which fuel may be supplied from the main passage. Similarly, auxiliary fuel may be supplied to the intake passage leading to the intake port which opens to the working chamber.

We claim:

1. Rotary piston type internal combustion engine comprising a casing having a cavity of multilobed trochoidal configuration defined by an inner peripheral wall and having a major and a minor axis, a substantially polygonal rotor disposed in said cavity of the casing with apex portions in sliding contact with said inner peripheral wall of the casing to define a plurality of working chambers which are variable in volume as the rotor rotates to effect intake, compression, expansion and exhaust strokes of the engine, intake port means provided in the casing for communication with the working chamber in intake stroke, intake passage means communicating with said intake port means, throttle valve means disposed in said intake passage means, exhaust port means provided in the casing for communication with the working chamber in exhaust stroke, main combustion chamber means provided outside the cavity in the casing and having a volume of 35 to 65% of the sum of the volume of the main combustion chamber means and that of the working chamber at top dead center, communication passage means comprising a single duct connecting the main combustion chamber means with the working chamber and opening to the working chamber at a position between 15° before and 30° after the minor axis of the trochoid of the cavity, main fuel supply means including main fuel injection nozzle means for supplying fuel to the main combustion chamber means, auxiliary fuel supply means for supplying fuel to the working chamber on the intake stroke, and control means for allowing the auxiliary fuel supply means to supply fuel to the working chamber during high load operation of the engine only and decreasing the amount of fuel supplied by the main fuel supply means to the main combustion chamber in relation to the increase in the amount of fuel supplied by the auxiliary fuel supply means to the working chamber during high load operation of the engine whereby the air-fuel ratio of mixture formed in the main combustion chamber can always be maintained between 10 to 16.

2. Rotary piston type engine in accordance with claim 1 in which said main fuel supply means includes main fuel passage means connected through said main fuel injection nozzle means to the main combustion chamber and said auxiliary fuel supply means includes auxiliary fuel passage means connected through auxiliary fuel injection nozzle means to the working chamber in intake stroke, said main and auxiliary fuel passage means being connected to a common fuel injection pump.

3. Rotary piston type engine in accordance with claim 2 in which said control means includes control valve means disposed in at least one of said main and auxiliary fuel passage means for allowing fuel to flow through the auxiliary fuel passage means into the working chamber during high load operation of engine.

4. Rotary piston type engine in accordance with claim 3 in which said control valve means is interconnected with said throttle valve means so that it is controlled in accordance with the throttle valve opening in such a manner that fuel is allowed to flow through the auxiliary fuel passage means into the working chamber with the throttle valve opening beyond a predetermined value.

5. Rotary piston type engine in accordance with claim 1 in which said main fuel supply means includes main fuel passage means connected on one hand with fuel injection pump means and on the other hand through said main fuel injection nozzle means into the main combustion chamber, said auxiliary fuel supply means includes auxiliary passage means connected on one hand with said main fuel injection nozzle means and on the other hand through auxiliary fuel injection nozzle means with the working chamber in intake stroke whereby fuel is supplied from the main fuel passage means through the main fuel injection nozzle means to the auxiliary fuel passage means during high load operation of engine so that the main fuel injection nozzle means is adequately cooled even when fuel supply to the main combustion chamber is decreased.

6. Rotary piston type engine in accordance with claim 5, in which the control means includes control valve means disposed in said auxiliary passage means for allowing fuel to flow therethrough into the working chamber during high load operation of engine.

7. Rotary piston type engine in accordance with claim 4 in which cam means is provided for controlling the control valve means in such a manner that minimum amount of fuel flow is maintained through the main fuel injection nozzle means with the throttle valve in full open position.

* * * * *